(12) United States Patent
Weinhold

(10) Patent No.: US 7,182,095 B2
(45) Date of Patent: Feb. 27, 2007

(54) VAPOR VALVE

(76) Inventor: Karl Weinhold, Im Jagdfeld 42, 41464 Neuss (DE)

( * ) Notice: Subject to any disclaimer, the term of this patent is extended or adjusted under 35 U.S.C. 154(b) by 0 days.

(21) Appl. No.: 10/533,705

(22) PCT Filed: Jun. 1, 2004

(86) PCT No.: PCT/EP2004/005886

§ 371 (c)(1),
(2), (4) Date: May 3, 2005

(87) PCT Pub. No.: WO2004/106785

PCT Pub. Date: Dec. 9, 2004

(65) Prior Publication Data

US 2006/0021653 A1 Feb. 2, 2006

(30) Foreign Application Priority Data

May 30, 2003 (DE) ................................ 103 24 874

(51) Int. Cl.
*F16K 11/00* (2006.01)
(52) U.S. Cl. .................................. 137/240; 251/315.01
(58) Field of Classification Search ................ 137/240; 251/315.01, 309, 315.1
See application file for complete search history.

(56) References Cited

U.S. PATENT DOCUMENTS

| | | | | |
|---|---|---|---|---|
| 3,228,412 A | * | 1/1966 | Peterson et al. | 137/240 |
| 3,985,150 A | * | 10/1976 | Kindersley | 137/240 |
| 4,304,252 A | | 12/1981 | Stanton | |
| 5,445,187 A | | 8/1995 | Farquhar | |

FOREIGN PATENT DOCUMENTS

| | | |
|---|---|---|
| DE | 24 01 459 | 1/1975 |
| DE | 92 02 121 | 4/1992 |
| DE | 202 09 195 4 | 11/2002 |

* cited by examiner

*Primary Examiner*—Kevin Lee
(74) *Attorney, Agent, or Firm*—The Webb Law Firm

(57) ABSTRACT

A valve, particularly a vapor valve, is disclosed and includes a housing into which an intake connecting piece, an outlet connecting piece, and a pressure relief outlet discharge, having a spherical closing part, mounted so it is rotationally movable by a lever. The outlet connecting piece is connected to the pressure relief outlet in the closed position (closed setting). An air supply inlet discharges into the housing and the spherical closing part may be rotated by more than 90° and is implemented so that after the closing motion around 90°, the closing part may be rotated further in the closing direction with the valve closed until the outlet connecting piece is connected to the air supply inlet with the pressure relief outlet closed again (purge setting).

20 Claims, 4 Drawing Sheets

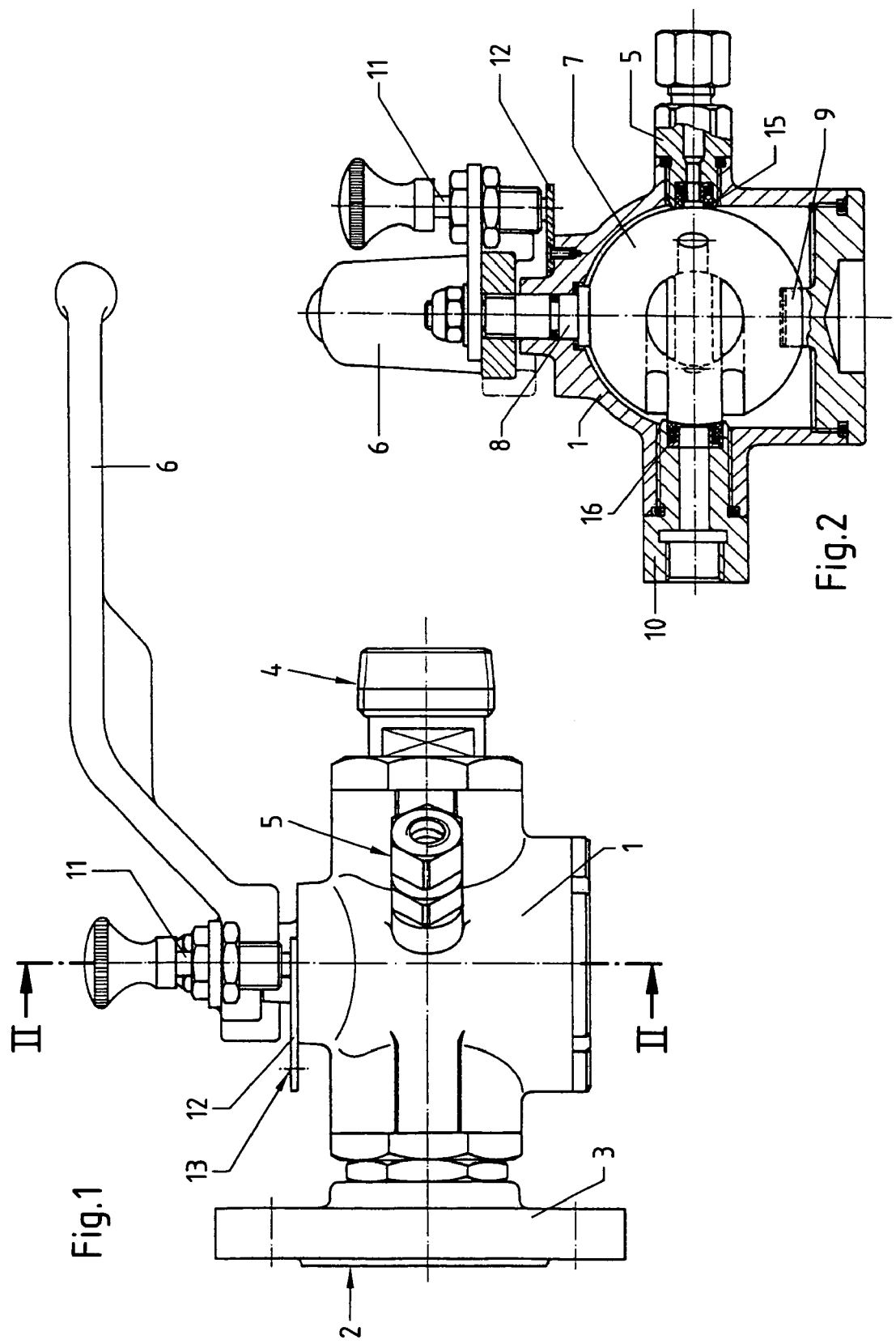

VAPOR VALVE

BACKGROUND OF THE INVENTION

1. Field of the Invention

The present invention relates to a valve, particularly a vapor valve, having a housing into which an intake connecting piece, an outlet connecting piece, and a pressure relief outlet discharge, having a spherical closing part, mounted so it is rotationally movable, which is movable by a hand lever, the outlet connecting piece being connected to the pressure relief outlet in the closed position (closed setting).

2. Description of the Related Art

Such valves, also referred to as "vapor cocks", are particularly used by the chemical industry and are known and available in many embodiments. Although the embodiments having pressure relief already represent a refinement in that the residual vapor pressure still remaining in the line after the main passage is closed may escape, this technical embodiment has the disadvantage that condensate and/or water still remaining in the lines must be removed, which is cumbersome. For this purpose, it is necessary, for example, to blow compressed air into the line through an additional cock in order to remove the condensate or water from the line, which is free of vapor pressure. Especially in the winter months, the lines may be clogged through ice formation of the condensate and/or water, so that there is a need for improvement here.

A known ball valve is described in DE 202 09 195 U1. The known ball valve has a housing, accommodating an essentially spherical valve body, in which a passage running in a straight line between two coaxially positioned connections is provided, which may be opened in a first setting of the valve body and may be closed in a second setting of the valve body. In this known valve, a hinge pin, which is movable in a radially elastic way, is fixed to a joint part using a locking pin, so that the catch device may no longer move radially inward. The known achievement of the object does describe a simple valve which may be produced cost-effectively, but in this case as well, the condensate and/or water still remaining in the lines must be removed, with corresponding complexity.

SUMMARY OF THE INVENTION

The present invention is therefore based on the object of designing and refining the valve cited at the beginning and described in greater detail above in such a way that, using a simply constructed design, the connected hose or pipe lines may be purged using air in order to reliably remove the condensate and/or water still present in the lines, without the advantage of pressure relief having to be dispensed with.

This object is achieved according to the present invention in that an air supply intake also discharges into the housing and the spherical closing part may be rotated by more than 90° and is implemented so that after the closing motion around 90°, the closing part is rotatable further in the closing direction with the valve closed, until the outlet connecting piece is connected to the air supply inlet, with the pressure relief outlet closed again (purge setting).

The present invention has recognized that it is possible to remove the undesired residues in the connected lines using one single valve, if, in addition to the two known settings (open setting and closed setting), the valve may also be set in a third setting (purge setting). For this purpose, the further rotation is performed around an angle of 20° to 45°, particularly 30°.

In order to avoid the valve being brought directly into the purge setting when the valve is closed, i.e., when the vapor supply is turned off, for example, according to a further embodiment of the present invention, the lever may be locked to the housing in a spring-loaded way in its closed setting. In this way, it is additionally ensured that unintentional opening of the valve is prevented in both directions.

So that, in spite of the large rotational motion, it is ensured that the spherical closing part remains positioned centrally to ensure the sealing function of all connections, the spherical closing part is double-mounted according to a further preferred teaching of the present invention.

The spherical closing part is sealed to the inlet connecting piece, to the pressure relief outlet, and to the air supply inlet using a spring-loaded sealing ring in each case. In this case, the sealing rings are preferably guided to the pressure relief outlet and to the air supply inlet by cast webs in the spherical closing part. Preferably, sealing rings made of glass-fiber reinforced plastic (GFRP), particularly PTFE, are used as the spring-loaded sealing rings. The springs used may be either coil springs or flat springs.

According to a further teaching of the present invention, the spherical closing part is manufactured from cast iron in a hard-chromium plated embodiment. This embodiment is especially expedient in order to be able to reasonably produce the required different channel shapes in the spherical closing part. Finally, the housing of the valve is preferably manufactured from stainless steel.

The present invention will be described in greater detail in the following on the basis of a drawing, which merely illustrates one preferred exemplary embodiment, on the basis of which the function of the valve according to the present invention will also be described in detail. In the drawing

BRIEF DESCRIPTION OF THE DRAWINGS

FIG. 1 is a side view of a valve according to the present invention;

FIG. 2 is a vertical section along the line II—II of the valve of FIG. 1;

DETAILED DESCRIPTION OF THE PREFERRED EMBODIMENTS

Figure 3:
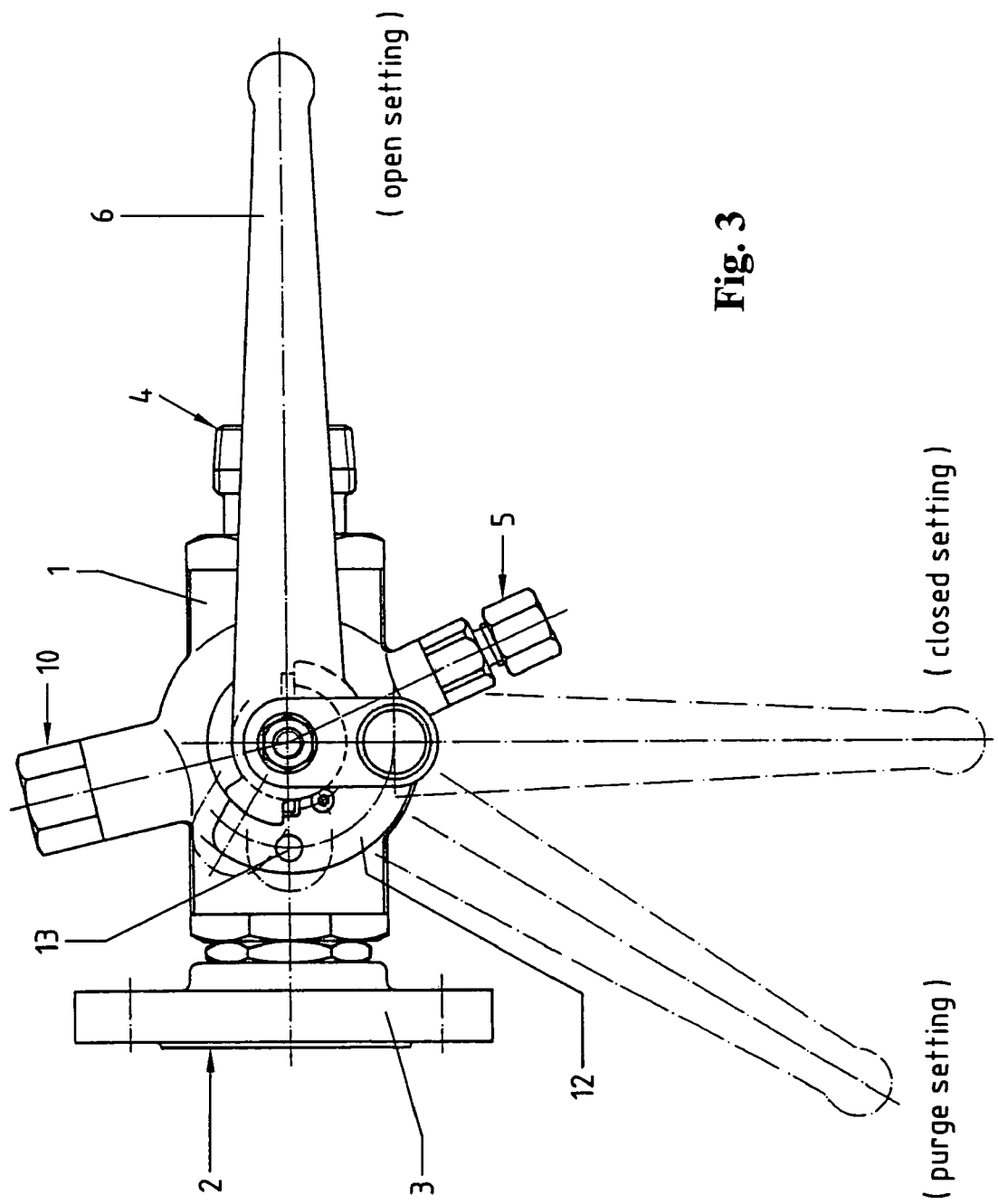
FIG. 3 is a top view of a valve according to the present invention.

A valve according to the present invention is shown in a side view in FIG. 1. The valve firstly has a housing 1, into which an inlet connecting piece 2, which is screwed to a flange 3 in the illustrated and preferred exemplary embodiment, and an outlet connecting piece 4 are screwed. A pressure relief outlet 5 may be recognized projecting laterally, which is intended in a known way for the purpose of "switching" the valve into its closed setting so that an outlet line (not shown) connected to the outlet connecting piece 4 is connected to the pressure relief outlet 5, so that a vapor pressure possibly still found in the line may dissipate even if the valve is closed. Instead of the flange 3 and the outlet connecting piece 4, which has a thread, any other arbitrary connections, such as couplings or the like, may be provided. The valve may also be welded directly into a pipeline.

The valve is actuated using a lever 6, implemented as a hand lever, which is mechanically connected to a spherical closing part 7, as is shown in FIG. 2. In the exemplary embodiment illustrated and thus preferred, the closing part 7 is double-mounted by two bearings 8 and 9 on diametrically opposing sides, so that its position is always defined precisely in all settings. It may also be seen from FIG. 2 that an air supply inlet 10 also discharges into the housing 1, which is again implemented as a threaded connecting piece. It is clear that all couplings and/or connecting pieces screwed into the housing 1 are provided with corresponding seals (not identified in greater detail).

FIG. 3 now shows the valve according to the present invention in a top view, the lever 6 being located in the open setting. In the preferred embodiment shown, the lever 6 is implemented so it may be locked to the housing 1 in its closed setting, which is only indicated by dot-dash lines. For this purpose, the lever 6 has a pin 11, provided with a handle, which is mounted so it may be displaced longitudinally with play and is offset laterally from the pivot point (not identified in greater detail). Upon reaching the closed setting, the pin 11 drops into a hole 13 located in a plate 12 attached to the housing 1, which may be seen particularly clearly in FIG. 3. Since the valve according to the present invention may also be installed in a different position, a further embodiment of the present invention provides that the pin 11 may also be implemented as spring-loaded, in order to cause a corresponding locking of the lever into the closed setting under all circumstances. The lever 6 may be brought back into the open setting only after manual unlocking by actuating the pin 11.

Finally, yet a third setting of the lever 6 is shown in FIG. 3, specifically the purge setting according to the present invention. In this case, the air supply inlet 10 of the housing 1, which is connected to a compressed air line, and the outlet connecting piece 4 are connected to the attached line (not shown), so that—when the vapor supply is closed—the line may be purged. The function of the valve according to the present invention will be described in greater detail in the following on the basis of the sectional illustrations in FIGS. 4 through 6.

Figure 4:
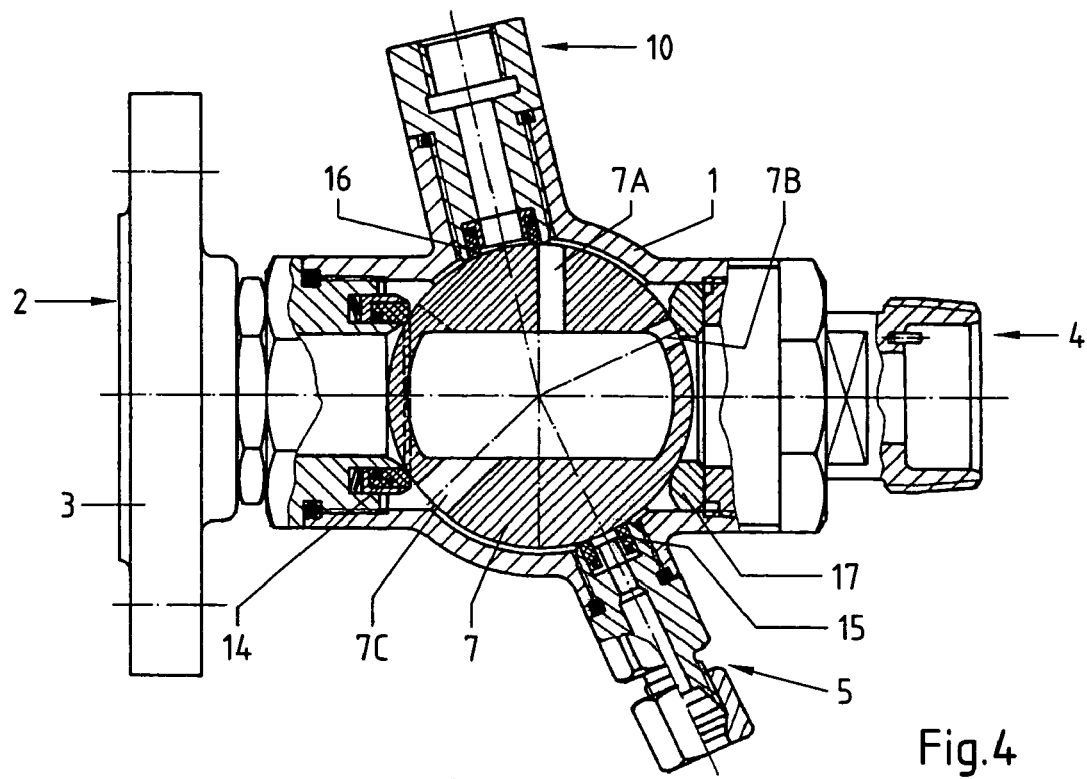
FIG. 4 is a side, partially sectional view of the valve of FIG. 1 in the open setting.
Figure 5:
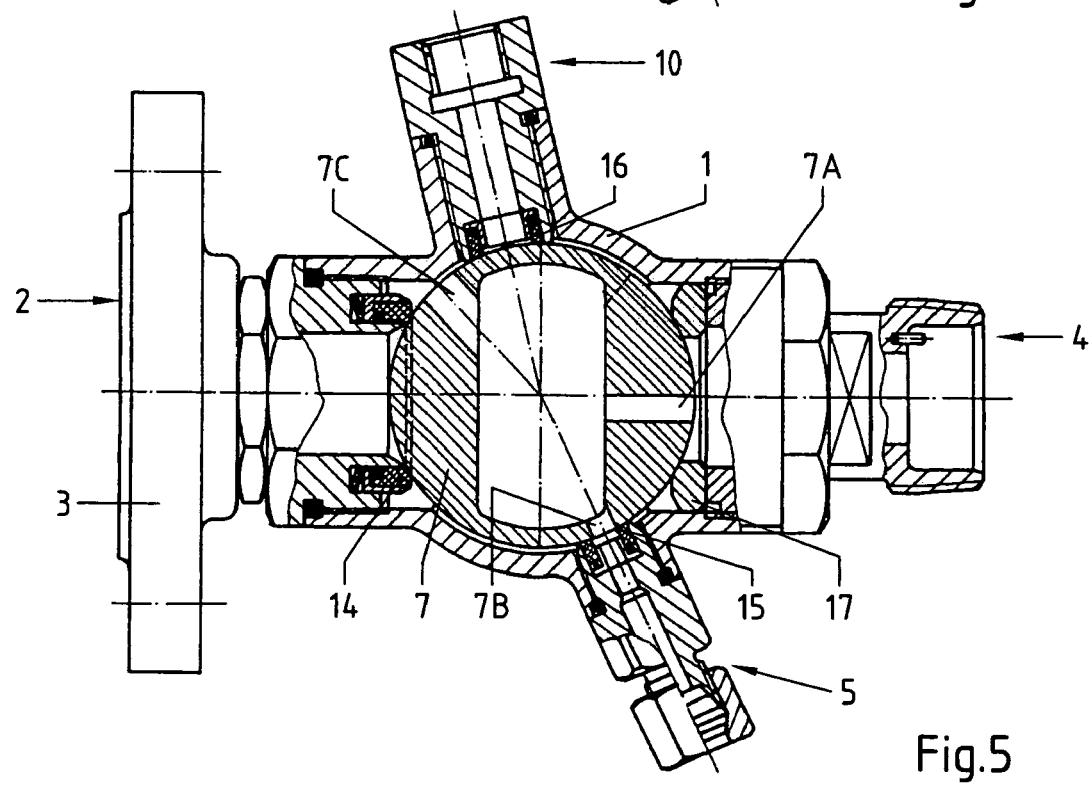
FIG. 5 is a side, partial sectional view of the valve of FIG. 1 in the closed setting.

When the shutoff valve is open, i.e., the setting of the valve according to the present invention in FIG. 4, the vapor flowing through the inlet connecting piece 2 may reach the line attached to the outlet connecting piece 4 unhindered through the central opening of the spherical closing part 7 (not described in greater detail). Both the pressure relief outlet 5 and the air supply inlet 10 are blocked in this setting. By actuating lever 6 and therefore the spherical closing part 7 around 90°, the main passage is closed, as shown in FIG. 5. However, the outlet connecting piece 4 and the pressure relief outlet 5 are connected to one another by the holes 7A and 7B in the spherical closing part 7, so that the remainder of the vapor pressure located in the line may escape through the pressure relief outlet 5. The lever 6 is locked to the housing 1 in this setting.

Figure 6:
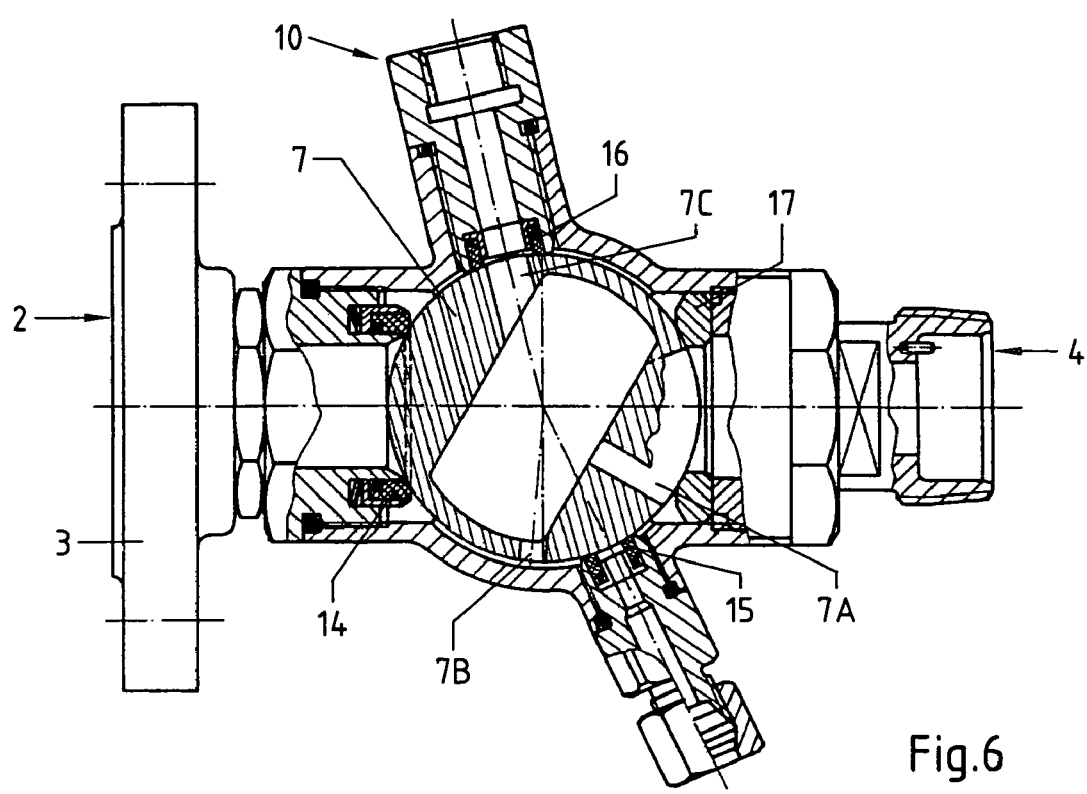
FIG. 6 is a side, partial sectional view of the valve of FIG. 1 in the purge setting.

If the lever 6 is now rotated further in the "closing direction" after corresponding unlocking, the valve is in its purge setting, as shown in FIG. 6. A compressed air line (not shown) attached to the air supply inlet 10 may now be used to purge the lines connected to the valve.

In this case, the air flows through the hole 7C in the spherical closing part 7 and reaches the outlet connecting piece 4 and the lines attached thereto through the hole 7A and a corresponding expansion (only indicated). In this case, both the inlet connecting piece 2 and the pressure relief outlet 5 are closed, so that the entire attached line may now be ventilated and purged by the valve. When this procedure has ended, the lever 6 is rotated back into the setting shown in FIG. 5, in which the pressure relief outlet 5 and the outlet connecting piece 4 are released. Through the repeated locking, the lever 6 is fixed in this closed setting, so that both the vapor inlet 2 attached to the inlet connecting piece 2 and the compressed air line attached to the air supply inlet 10 are closed.

The valve according to the present invention leads to a significant economic advantage, since no additional devices are necessary in order to remove the disadvantages present in the related art. Two different functions may be performed using one single valve.

The invention claimed is:

1. A valve, comprising a housing into which an intake connecting piece, an outlet connecting piece, and a pressure relief outlet discharge, and a spherical closing part, mounted so the spherical closing part is rotationally movable by a lever, wherein the outlet connecting piece is connected to the pressure relief outlet in a closed position, wherein an air supply inlet also discharges into the housing and the spherical closing part is rotatable by more than 90°, such that after a closing motion around 90°, the closing part is further rotatable in the closing direction with the valve closed until the outlet connecting piece is connected to the air supply inlet with the pressure relief outlet closed again.

2. The valve according to claim 1, wherein the further rotation into a purge setting is performed around an angle in the range of about 20° to about 45°.

3. The valve according to claim 2, wherein the further rotation into the purge setting is performed around an angle of about 30°.

4. The valve according to claim 1, wherein the lever is locked to the housing in its closed setting.

5. The valve according to claim 4, wherein the locking is performed in a spring-loaded operation.

6. The valve according to claim 1, wherein the spherical closing part has double bearings.

7. The valve according to claim 1, wherein the spherical closing part is sealed in relation to the intake connecting piece, the pressure relief outlet, and the air supply inlet with a respective spring-loaded sealing ring.

8. The valve according to claim 7, wherein cast webs are provided in the spherical closing part to guide the sealing rings to the pressure relief outlet and to the air supply inlet.

9. The valve according to claim 7, wherein the sealing rings are made of glass-fiber reinforced plastic.

10. The valve according to claim 1, wherein the spherical closing part is supported toward the outlet connecting piece using a thrust collar made of bearing metal.

11. The valve according to claim 1, wherein the spherical closing part is manufactured from cast iron in a hard-chromium plated embodiment.

12. The valve according to claim 1, wherein the housing is made of stainless steel.

13. The valve according to claim 1, wherein the valve is at least one of a vapor valve and a steam valve.

14. The valve according to claim 1, wherein the lever is a hand lever.

15. The valve according to claim 2, wherein the lever is locked to the housing in its closed setting.

16. The valve according to claim 3, wherein the lever is locked to the housing in its closed setting.

17. The valve according to claim 2, wherein the spherical closing part has double bearings.

18. The valve according to claim 3, wherein the spherical closing part has double bearings.

19. The valve according to claim 4, wherein the spherical closing part has double bearings.

20. The valve according to claim 5, wherein the spherical closing part has double bearings.

* * * * *